United States Patent
Barlock et al.

(10) Patent No.: US 6,651,095 B2
(45) Date of Patent: *Nov. 18, 2003

(54) METHODS, SYSTEMS AND COMPUTER PROGRAM PRODUCTS FOR MANAGEMENT OF PREFERENCES IN A HETEROGENEOUS COMPUTING ENVIRONMENT

(75) Inventors: Denise Lynnette Barlock, Raleigh, NC (US); Steven Dale Ims, Apex, NC (US); David Bruce Lindquist, Raleigh, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/211,675

(22) Filed: Dec. 14, 1998

(65) Prior Publication Data

US 2003/0069944 A1 Apr. 10, 2003

(51) Int. Cl.[7] ............................................. G06F 15/173
(52) U.S. Cl. ..................... 709/223; 709/220; 709/224
(58) Field of Search .................................. 709/220, 212, 709/226, 228, 217, 219, 200, 223, 227, 242, 238; 707/10; 713/201

(56) References Cited

U.S. PATENT DOCUMENTS

| | | | | |
|---|---|---|---|---|
| 5,623,695 A | * | 4/1997 | Lozinski et al. ................ 710/8 |
| 5,875,327 A | * | 2/1999 | Brandt et al. ................ 395/651 |
| 5,938,722 A | * | 8/1999 | Johnson ....................... 709/105 |
| 5,948,064 A | * | 9/1999 | Bertram et al. ............. 709/225 |
| 6,061,795 A | * | 5/2000 | Dircks et al. ................ 713/201 |
| 6,065,054 A | * | 5/2000 | Dutcher et al. ............. 709/226 |
| 6,092,199 A | * | 7/2000 | Dutcher et al. ............. 713/201 |
| 6,205,476 B1 | * | 3/2001 | Hayes, Jr. ................... 709/220 |
| 6,282,712 B1 | * | 8/2001 | Davis et al. ................. 717/170 |

OTHER PUBLICATIONS http://nf/pdc97/profiles and policies.htm "Guide to Microsoft Windows NT 4.0 Profiles and Policies" pp. 1–76.
http://www/ieft.org/htlm.charters/acap–charter.html "Application Configuration Access Protocol (acap)," 68 pages.
IBM Network Station Manager for Windows NT Server 4.0, Chapter 5. Using the IBM Network Station Manager, pp. 5–1 to 5–15.
http://www.software.ibm.com/os/warp/library/sq202822.htm, "WorkSpace on–Demand Handbook," Chapters 2.3.1; 6.2; 6.3; 6.3.1; 6.3.3; 6.5.
http://www.triteal.com/SoftNC, Java Desktop Environment from Triteal, pp. 1–2.
http://java.sun.com/products/hot–javaviews/admin.html, "HotJava Views," pp. 1–24.

(List continued on next page.)

*Primary Examiner*—Frantz B. Jean
(74) *Attorney, Agent, or Firm*—Myers Bigel Sibley & Sajovec, P.A.; Jeanine S. Ray-Yarletts

(57) ABSTRACT

Methods, systems and computer program products are provided for managing user preferences in heterogenous networks. A native application is selected and a software routine and user preferences obtained from a server which allows installation of the user preferences of the native application on the computer obtaining the preferences. Thus, the software routine obtained may be tailored to the particular computer executing the native application. This routine may be downloaded without requiring intervention at the computer and may be downloaded only if needed by selection of an application. Furthermore, the user preferences may be selected based on a user or user group such that the preferences may be used on different computer by the same user or user group.

54 Claims, 2 Drawing Sheets

OTHER PUBLICATIONS http://esuite.lotus.com/eSuite/eSuite, "The Right Work Environment for Network Centric Computing," 24 pages.

http://www.novell.com/corp/collarteral/docs/4620902.html. "Z.E.N. works™ Zero Effort Networks for Users" (1998) pp. 1–9.

http://www.novell.com/products/nds/zenworks/prodinfo.html. "Product Info. Z.E.N. works" (1998).

http://www.microsoft.com/windows/platform/info/zawmb.htm. "The 'Zero Administration' Initiative for Windows," White Paper 1997.

http://www.tivoli.com/o_news/html/body_itdirector_ships.html. "Tivoli Ships Breakthrough Management Product Designed Exclusively for Small and Medium Businesses," Austin, Texas, Jul. 13, 1998.

DiCarlo, Lisa, "Microsoft previews Zero Administration at CeBIT," http://www.zdnet.com/pcweek/news/0310/1, Mar. 13, 1997.

DiCarlo et al. "Microsoft ready to show'zero administration,'" http://www.zdnet.com/pcweek/news/0310 Mar.7, 1997.

* cited by examiner

METHODS, SYSTEMS AND COMPUTER PROGRAM PRODUCTS FOR MANAGEMENT OF PREFERENCES IN A HETEROGENEOUS COMPUTING ENVIRONMENT

FIELD OF THE INVENTION

The present invention relates to network management in general and in particular to preference management in a network environment.

BACKGROUND OF THE INVENTION

Traditional mainframe computer configurations provided for user interface to the computer through computer terminals which were directly connected by wires to ports of the mainframe computer. As computing technology has evolved, processing power has typically evolved from a central processing center with a number of relatively low-processing power terminals to a distributed environment of networked processors. Examples of this shift in processing include local or wide area computer networks which interconnect individual work stations where each workstation has substantial independent processing capabilities. This shift may be further seen in the popularity of the Internet which interconnects many processors and networks of processors through devices such as, for example, routers. This type of network environment is often referred to as a client-server environment with client stations coupled to and supported by a server station.

In the modern distributed processing computer environment, control over software, such as application programs, is more difficult than where a mainframe operated by an administrator is used, particularly for large organizations with numerous client stations and servers distributed widely geographically and utilized by a large number of users. Furthermore, individual users may move from location to location and need to access the network from different client stations at different times. The networked environment increases the challenges for a network administrator in maintaining proper licenses for existing software and deploying new or updated applications programs across the network.

A further complication in network systems is that, typically, these systems include combinations of network applications and native applications. As used herein "native applications" refers to applications which are installed locally on a workstation such that preferences associated with the native application are stored on the workstation. For example, certain applications may be unavailable in network versions and may require installation on a local storage device. These applications are typically difficult to manage in that user preferences are individual to the workstation. Thus, when a user moves from workstation to workstation the user's preferences typically do no migrate to the new workstation.

Efforts to provide preference mobility include, for example, Novell's Z.E.N.works™, Microsoft's "Zero Administration" initiative for Windows® and International Business Machines Corporation's (IBM's) Workspace On Demand™. However, these solutions each typically require pre-installation of software at the workstation to support their services. For example, Novell's Z.E.N. and IBM's Workspace On Demand utilize a vendor-supplied support layer in the operating system to enable their services. In addition to modifying the workstations operating system at startup to setup tasks to customize the user's environment, the Microsoft Zero Administration solution may be limited to a homogeneous environment where the workstation and the server are utilizing the same operating system.

These various approaches fail to provide a seamless integration of user preferences for native applications across heterogeneous networks. Furthermore, such solutions may reduce network administration only after initial installation on each workstation.

SUMMARY OF THE INVENTION

Accordingly, it is an object of the present invention to provide methods, systems and computer program products for management of preferences in a network environment.

It is a further object of the present invention to provide such methods, systems and computer program products which do not require pre-installation of software at the workstations.

It is a further object of the present invention to provide such methods, systems and computer program products that can automatically accommodate various types of hardware operating under different operating systems.

These and other objects are provided, according to the present invention, by selecting a native application and obtaining a software routine and user preferences from a server which allows installation of the user preferences on the computer obtaining the preferences. Thus, the software routine obtained may be tailored to the particular computing environment executing the native application. This routine may be downloaded without requiring intervention at the computer and may be downloaded only if needed by selection of an application. Furthermore, the user preferences may be selected based on a user or user group such that the preferences may be used on different computers by the same user or user group.

Obtaining a software routine when a native application is selected, where the software routine obtains and installs user preferences, allows for the user preferences to be commonly maintained. Furthermore, the obtaining of a software routine allows differing software routines to be obtained for differing operating environments, for example differing operating systems. Thus, group consistency may be maintained by maintenance of the user preferences in a repository of preferences and by providing preferences for the differing operating environments in a network. Furthermore, because the preferences are obtained from a computer other than the user's computer, the preferences for the native application may be transpotrted from computer to computer as the user moves from computer to computer. Such portable preferences may even be supported if the computers utilize different operating system. Accordingly, the present invention allows for management of preferences in a heterogenous network while maintaining preference portability and group consistency. Furthermore, the present invention allows for mobility and group consistency of preferences in systems which use existing applications in existing operating systems without modification of either the operating system or the application.

In a particular embodiment of the present invention, user preferences associated with an application resident on a first computer are established based on preferences resident on a second computer remote from the first computer by obtaining from a computer other than the first computer, a software routine corresponding to the first computer. The software routine is executed on the first computer to retrieve the user preferences associated with the application from the second computer and replace native user preferences resident on the first computer and associated with the application with the retrieved user preferences. It is determined if an instance of the application has been requested by a user of the first computer and an instance of the application is launched on the first computer utilizing the retrieved user preferences.

In a further embodiment, the user preferences are retrieved by selecting user preferences associated with the application resident on the first computer from a plurality of user preferences resident on the second computer. The selected user preferences are then retrieved. The user preferences are selected based upon a user logged onto the first computer. Furthermore, the user preferences may be selected based on characteristics of an operating environment of the first computer. In particular, the characteristics of the operating environment may comprise the type of operating system of the first computer.

In another embodiment of the present invention, the software routine may be obtained by selecting a software routine from a plurality of software routines stored on at least one computer other than the first computer, wherein the software routine is selected based on characteristics of the first compute. The selected software routine is then retrieved. In particular, the characteristics of the first computer may be a type of operating system of the first computer.

In still another embodiment of the present invention, the native user preferences are stored, It is determined if the launched instance of the application has terminated and the retrieved user preferences are then replaced with the native user preferences after the application terminates.

In still another embodiment of the present invention, the determining, retrieving and replacing operations are carried out for each request by a user to execute the application.

Furthermore, any changes in the user preferences associated with an application resident on the first computer may be stored for use on the second computer. Thus, any changes in user preferences may be accessed at a later time by the user.

In a particular embodiment of the present invention, the software routine is a machine independent software routine. Thus, the software routine may be a JAVA applet.

In another embodiment of the present invention, user preferences associated with an application resident on a first computer are established by determining an operating environment associated with the first computer and providing a software routine corresponding to the determined operating environment to the first computer. User preferences are selected based on the determined operating environment and the selected user preferences installed on the first computer using the obtained software routine. The user preferences may also be selected based upon a user logged onto the first computer.

In a further embodiment, users are associated with a group. In such a case, the user preferences may be selected based on the group associated with a user logged onto the first computer.

In another embodiment, the installation of the selected user preferences may be preceded by copying user preferences stored on the first computer. Furthermore, the installation may be followed by launching the application on the first computer. It may then be determined if the launched application has terminated. The copied user preferences may then be re-installed on the first computer. Such re-installing operation may be preceded by storing the user preferences on a second computer remote from the first computer.

While the invention has been described above primarily with respect to the method aspects of the invention, both systems and computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As will be appreciated by one of skill in the art, the present invention may be embodied as methods, systems or computer program products. Accordingly, the present invention may take the form of a hardware embodiment, a software embodiment or an embodiment combining software and hardware aspects.

Figure 1:
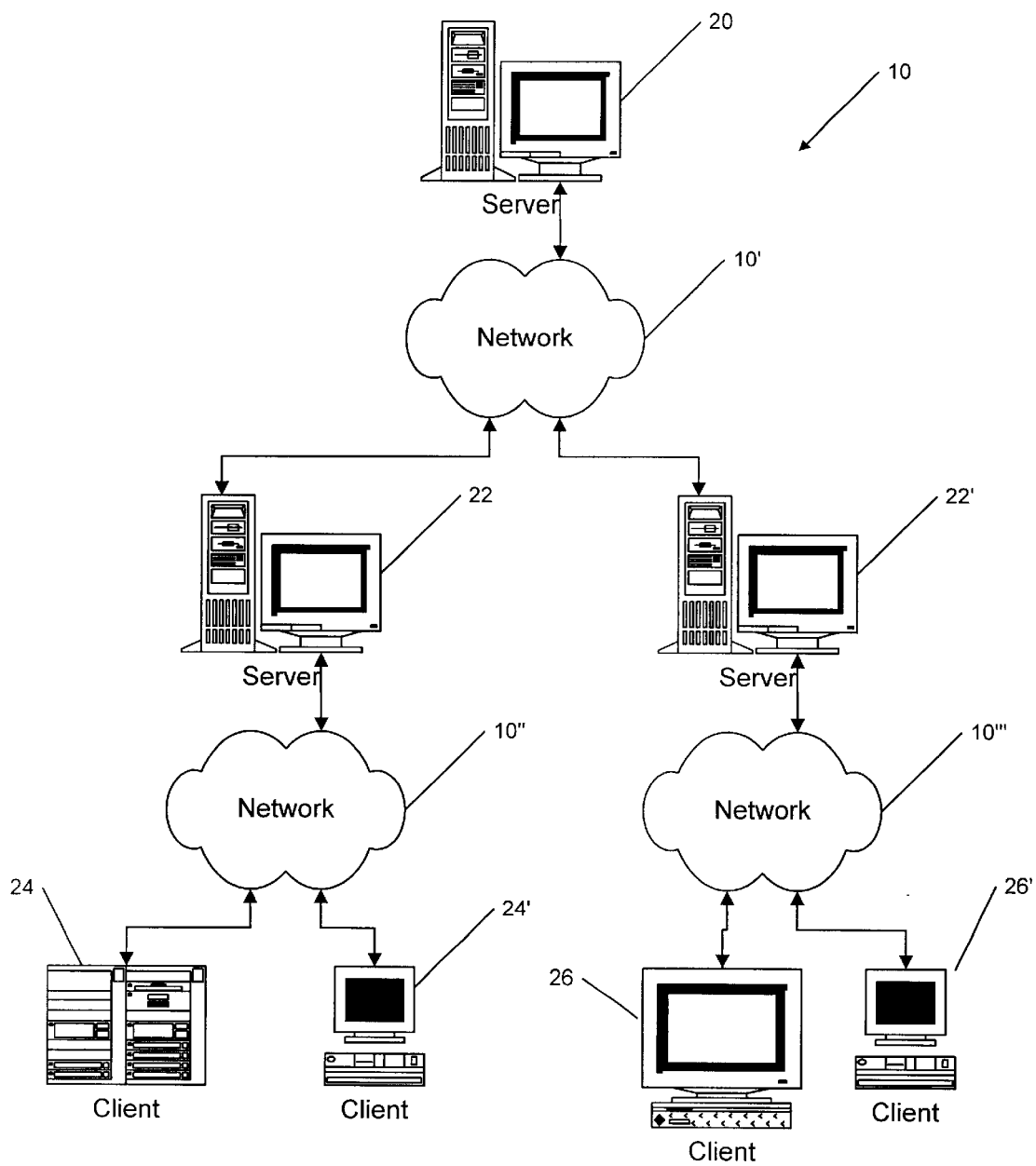
FIG. 1 is a schematic diagram of a computer network suitable for use with the present invention.

FIG. 1 illustrates an embodiment of a computer network suitable for use with the present invention. Computer network system 10 includes a server 20 such as a Tivoli™ server and on-demand servers 22, 22'. System 10 further includes client stations 24, 24', 26, 26'. As illustrated, on-demand servers 22, 22' are connected to server 20 over a first network segment 10'. Client stations 24, 24' are served by on-demand server 22 and communicate over network 10". Similarly, clients 26, 26' are served by server 22' and communicate over network 10'". As schematically illustrated in FIG. 1, client stations 24, 24', 26, 26' may be hardware from a variety of vendors operating a variety of different operating systems. However, in a preferred embodiment, each of the client stations 24, 24', 26 and 26'are capable of executing a JAVA™ (Sun Microsystems, Inc.) enabled web browser.

System 10, as illustrated in FIG. 1, is a centrally managed computer network with server 20 acting as the central administration station executing network management software such as TME 10 from Tivoli Systems, Inc. Servers 22, 22' act as on-demand servers for their respective associated client stations 24, 24', 26, 26' and provide for client/server application support. It is further to be understood that networks 10', 10", 10'" may be separate physical networks, separate partitions of a single physical network or may be a single network. Furthermore, server 20 may be configured to allow for direct communication between server 20 and clients 24, 24', 26, 26'.

As will be described further herein with reference to FIG. 2, server 20, server 22 and/or server 22' may have stored on them or have access to a repository of preferences associated with local (native) applications resident on clients 24, 24', 26 and 26'. Thus, for example, server 20 could maintain the repository of preferences which could then be accessed by on-demand servers 22 and 22'. Alternatively, a copy of the repository could be maintained at all or a portion of the servers.

Preferably, on-demand servers 22, 22' are configured to operate within the eNetwork™ environment available from International Business Machines Corporation. Preferably the present invention is utilized in an On-Demand Server™ (IBM) system such as that described in commonly assigned and concurrently filed U.S. patent application Ser. No. 09/211,528, entitled METHODS, SYSTEMS AND COMPUTER PROGRAM PRODUCTS FOR CENTRALIZED MANAGEMENT OF APPLICATION PROGRAMS ON A NETWORK, and U.S. patent application Ser. No. 09/211,529, entitled METHODS, SYSTEMS AND COMPUTER PROGRAM PRODUCTS FOR MANAGEMENT OF CONFIGURABLE APPLICATION PROGRAMS ON A NETWORK, the disclosures of which are hereby incorporated by reference as if set forth fully herein. Similarly, the present invention may be utilized with a rules based preference and configuration management system such as that described in concurrently filed and commonly assigned U.S. patent application Ser. No. 09/211,527, entitled METHODS, SYSTEMS AND COMPUTER PROGRAM PRODUCTS FOR POLICY BASED NETWORK CONTROL OF CHARACTERISTICS OF USER SESSIONS, the disclosure of which is hereby incorporated by reference as if set forth fully herein. However, while the present invention may be implemented in this environment, it is also suitable for use with other client/server and network management environments.

As is described in more detail below, the present invention allows for establishing user preferences for an application by downloading a software routine, such as a JAVA applet, which installs the user preferences, obtained from a repository, on the local client station. Such a system may be independent of the hardware or operating system utilized as the software routine downloaded may be customized to the particular operating system utilized by the client station. Thus, for example, a Unix client station may download a different software routine than a Windows95® client station for the same user application. The software routine then accesses the repository to obtain the preference information to install on.the local machine. Thus, if the preferences for a user application differ from operating system to operating system it may be desirable to maintain in the repository preferences for each operating system a user has used as well as default preferences if a user has not previously used the application in a particular operating system. Such default preferences may be common to all users or differ with different user groups associated with users. Preferably, the preferences are stored in a common format for access by the software routines.

Furthermore, it is also preferred that the user preferences be associated with a particular user or group of users such that the preferences may be retrieved by the software routine based on a user or an association of a user with a group. Thus, for example, all users in a "sales" group would be provided the same letterhead templet for use in the sales groups word processor application. As is evident from the above discussion, the term "user preferences" as used herein should not be construed as limited to particular settings of an application configurable by a user but may include any configurable aspect of an application, application interface or operating system, such as window sizes and locations, template, default file locations and the like. Thus, the present invention may provide group consistency, in that users of a group of users may be presented with the same user preferences, as well as preference portability, in that users may move from client station to client station and still utilize the same preferences for native applications.

Operations of the present invention will now be described with respect to the flowchart of FIG. 2. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Referring now to the flowchart of FIG. 2, operations for preference management in a heterogeneous computing environment according to an embodiment of the present invention will now be described. As has been described above, preferably, the present invention is utilized with a JAVA enabled browser. Accordingly, launching of a local or native application is preferably accomplished by selecting an icon displayed on the user interface of the browser executing on the client station 24, 24', 26 or 26'. Selection of such icon preferably causes an applet associated with the icon to execute on the local machine.

As is described below, this applet may download an operating system specific applet which installs user preferences. However, the present invention is not limited to any particular partitioning of function between the downloaded applet and initial applet associated with the icon. Thus, for example, the selection of an icon to launch the local application could immediately cause the download of an applet for installation of the preferences or the selection of the icon could result in retrieving the user preferences and then downloading an applet to install the preferences. Alternatively, the initial applet associated with the icon could perform all functions. Preferably the icons and applets associated with the icon are obtained from an on demand server 22 or 22' such that all client stations 24, 24', 26 and 26' operate in a consistent manner whatever the partitioning of function. Accordingly, the discussion below with regard to a particular partitioning of functions should not be construed a limiting the present invention to such partitioning.

Figure 2:
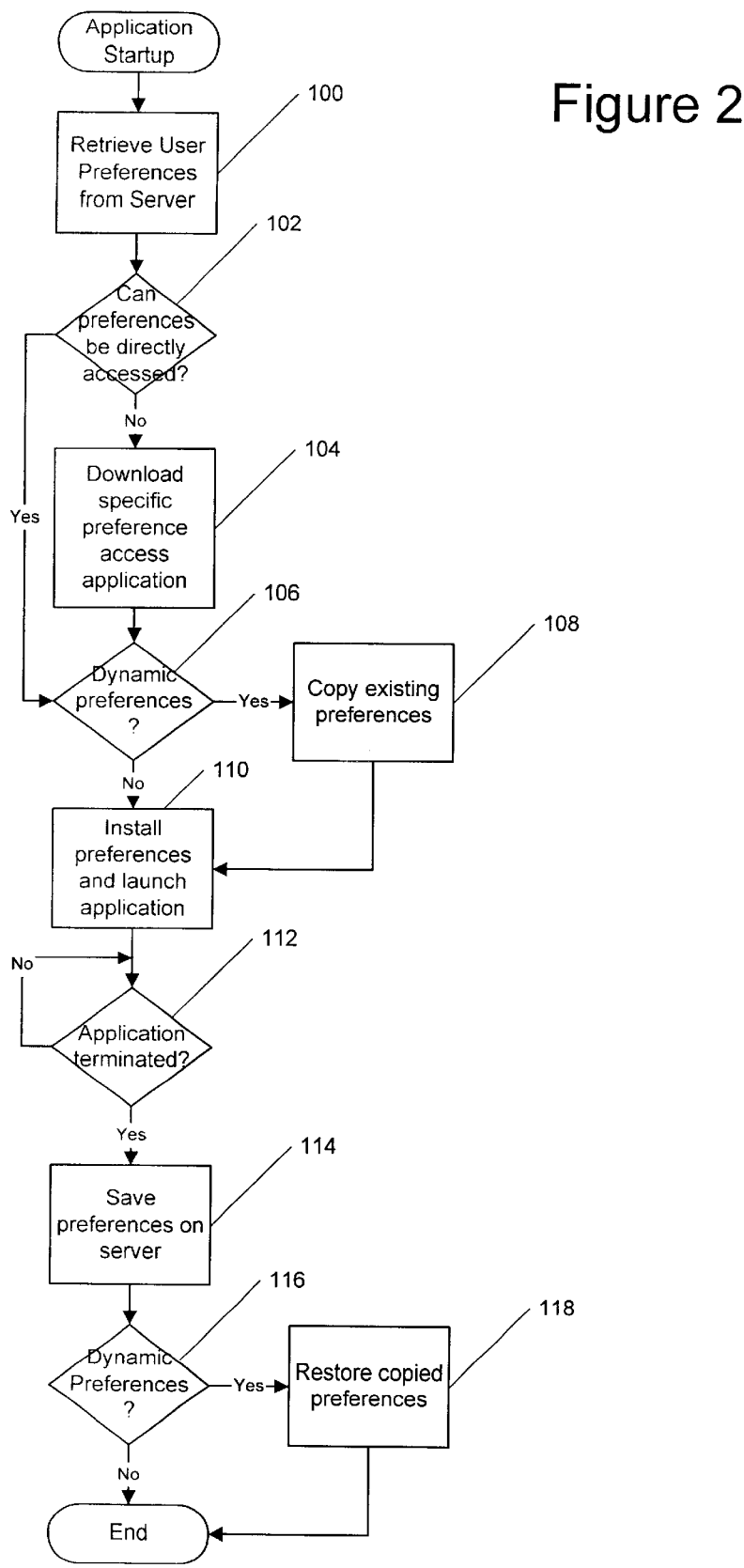
FIG. 2 is a flowchart illustrating operations for establishing preferences for local applications according to an embodiment of the present invention.

As seen in FIG. 2, when a user selects startup of a local application, such as by selecting an icon in a graphical user interface of a web browser, the user preferences are retrieved from the server 22 or 22' (block 100). The user preferences are preferably selected from a plurality of user preferences stored at or accessible to servers 22 or 22' as described above. Furthermore, the user preferences are preferably retrieved based on a user identification associated with a user using the client station 24, 24', 26, or 26' (i.e. a userid supplied when logging on to server 22 or 22') as well as the operating system associated with the application selected by the user.

As is further seen in FIG. 2, after obtaining the preferences, it is determined if the preferences may be directly accessed or whether an additional applet is required to access the user preferences on the client station 24, 24', 26, or 26' (block 102). For example, in Unix or 16 bit Windows® environments, the preferences may be directly accessed, however, in 32 bit Windows® environments, the preferences are accessed through the registry. Thus, a registry management applet may be needed to access the registry to install preferences.

If a specific preference access applet is needed, then the client station 24, 24', 26, or 26' downloads the applet from the server 22 or 22' (block 104). In either case, it is determined if dynamic preferences are enabled (block 106). Dynamic preferences refers to the ability to restore the preferences for a client station 24, 24', 26, or 26' to the preferences for the application which were present before the user preferences obtained from the server 22 or 22' were installed. Such preferences may be referred to as "native preferences." Thus, the copying and reinstallation of native preferences may allow a user to use a client station other than their own without affecting the user preferences of other users utilizing the client station, such as users without network access.

If dynamic preferences are enabled, then a copy of the existing preferences is made (block 108). In either case, the preferences obtained from the server 22 or 22' are then installed on the client station 24, 24', 26, or 26' and the selected application launched (block 110). When the application terminates (block 112) the preferences of the application are then saved on the server 22 or 22' so as to update any changes the user made to the preferences (block 114). If dynamic preferences are enabled (block 116), then the stored copy of the preferences is re-installed on the client station 24, 24', 26, or 26' (block 118).

Thus, the present invention utilizes machine independent applets to provide operating system dependent preference installation such that preferences for native applications may be transported from client station to client station even in a heterogeneous operating environment.

Furthermore, as will be appreciated by those of skill in the art in light of the present disclosure, because the preferences are stored in a central repository, the preferences may be centrally controlled and administered. Thus, if a change in the preferences for a group is required, that change may be made at the central repository. For example, if a new letterhead is to be used by the sales group, that change may be made at the central repository rather than at each workstation. Also, this change would be portable to whatever workstation a user from the sales group uses as long as the server to which the workstation connects has access to the central repository of preferences.

Restrictions as to changes in user preferences may be controlled through the central repository. In particular, if a user changes a preference, that preference change may be discarded by the central repository when the preferences are stored and a default substituted. Thus, changes in preferences may be limited to a single session and return to the previous preferences for subsequent sessions.

The central repository also allows for creating a common set of default preferences which may be provided if user preferences are not available for a particular user. Thus, for example, if a user has only used a word processor in Windows95®, when the user utilizes a Unix workstation the user would be provided with the default preferences for the Unix version of the word processor. Thereafter, preferences would be stored for the user for the Unix version of the word processor and made available for subsequent uses by the user. Thus, a common and familiar preference set may be provided to the user across platforms and computing environments.

While the present invention has been described with respect to obtaining preferences each time the application is selected, the present invention may also be utilized such that preferences are obtained periodically or only once for a session. Thus, for example, preferences could be obtained the first time an application is selected each day. Alternatively, preferences could by obtained the first time an application is selected after a user logs on. Thus, the present invention should not be limited to any particular interval or periodicity of obtaining preferences.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of establishing user preferences associated with an application resident on a first computer based on preferences resident on a second computer remote from the first computer, the method comprising:

receiving a request from a user of the first computer, wherein the received request is associated with a request for an instance of the application;

obtaining from a computer other than the first computer, a software routine corresponding to the first computer;

executing the software routine on the first computer, wherein the software routine carries out the steps of:

retrieving the user preferences associated with the application from the second computer; and replacing native user preferences resident on the first computer and associated with the application with the retrieved user preferences;

launching an instance of the application on the first computer utilizing the retrieved user preferences.

2. A method according to claim 1, wherein said retrieving step comprises the steps of:

selecting user preferences associated with the application resident on the first computer from a plurality of user preferences resident on the second computer; and retrieving the selected user preferences.

3. A method according to claim 2, wherein the user preferences are selected based upon the user requesting the instance of the application.

4. A method according to claim 2, wherein the user preferences are selected based on characteristics of an operating environment of the first computer.

5. A method according to claim 4, wherein the characteristics of the operating environment comprise the type of operating system of the first computer.

6. A method according to claim 1, wherein said step of obtaining a software routine comprises the steps of:

selecting a software routine from a plurality of software routines stored on at least one computer other than the first computer, wherein the software routine is selected based on characteristics of the first computer; and retrieving the selected software routine.

7. A method according to claim 6, wherein the characteristics of the first computer comprises a type of operating system of the first computer.

8. A method according to claim 1, further comprising the steps of:

storing the native user preferences;

determining if the launched instance of the application has terminated; and replacing, responsive to the determining step, the retrieved user preferences with the native user preferences.

9. A method according to claim 1, wherein said said retrieving and said replacing steps are carried out for each request by a user.

10. A method according to claim 1, further comprising the steps of:

obtaining updated user preferences associated with an application resident on the first computer; and storing the updated user preferences on the second computer.

11. A method according to claim 1, wherein the software routine is a machine independent software routine.

12. A method according to claim 11, wherein the software routine is a JAVA applet.

13. A method of establishing user preferences associated with an application resident on a first computer, the method comprising:

determining an operating system of the first computer;

providing a software routine corresponding to the determined operating system to the first computer;

selecting user preferences based on the determined operating system; and installing the selected user preferences on the first computer using the obtained software routine.

14. A method according to claim 13, wherein the user preferences are further selected based upon a user requesting an instance of the application on the first computer.

15. A method according to claim 13, further comprising the step of:

associating users with a group; and wherein the selected user preferences are further selected based on the group associated with a user requesting an instance of the application on the first computer.

16. A method according to claim 13, wherein said installing step is preceded by the step of copying native user preferences stored on the first computer.

17. A method according to claim 16, wherein said installing step is followed by the steps of:

launching an instance of the application on the first computer;

determining if the launched application has terminated; and re-installing, responsive to the determining step, the copied native user preferences on the first computer.

18. A method according to claim 17, wherein said re-installing step is preceded by the step of storing the user preferences on a second computer remote from the first computer.

19. A system for establishing user preferences associated with an application resident on a first computer based on preferences resident on a second computer remote from the first computer, comprising:

means for receiving a request from a user of the first computer, wherein the received request is associated with a request for an instance of the application;

means for obtaining from a computer other than the first computer, a software routine corresponding to the first computer;

means for executing the software routine on the first computer;

means for retrieving the user preferences associated with the application from the second computer;

means for replacing native user preferences resident on the first computer and associated with the application with the retrieved user preferences; and means for launching an instance of the application on the first computer utilizing the retrieved user preferences.

20. A system according to claim 19, wherein said means for retrieving comprises:

means for selecting user preferences associated with the application resident on the first computer from a plurality of user preferences resident on the second computer; and means for retrieving the selected user preferences.

21. A system according to claim 20, wherein the user preferences are selected based upon the user requesting the instance of the application.

22. A system according to claim 20, wherein the user preferences are selected based on characteristics of an operating environment of the first computer.

23. A system according to claim 22, wherein the characteristics of the operating environment comprise the type of operating system of the first computer.

24. A system according to claim 19, wherein said means for obtaining a software routine comprises:

means for selecting a software routine from a plurality of software routines stored on at least one computer other than the first computer, wherein the software routine is selected based on characteristics of the first computer; and means for retrieving the selected software routine.

25. A system according to claim 24, wherein the characteristics of the first computer comprises a type of operating system of the first computer.

26. A system according to claim 19, further comprising:

means for storing the native user preferences;

means for determining if the launched instance of the application has terminated; and means, responsive to the means for determining, for replacing the retrieved user preferences with the native user preferences.

27. A system according to claim 19, further comprising means, responsive to said means for receiving, for controlling said means for retrieving and said means for replacing in response to each request by a user for an instance of the application.

28. A system according to claim 19, further comprising:

means for obtaining updated user preferences associated with an application resident on the first computer; and means for storing the updated user preferences on the second computer.

29. A system according to claim 19, wherein the software routine is a machine independent software routine.

30. A system according to claim 29, wherein the software routine is a JAVA applet.

31. A system for establishing user preferences associated with an application resident on a first computer, comprising:

means for determining an operating system of the first computer;

means for providing a software routine corresponding to the determined operating system to the first computer;

means for selecting user preferences based on the determined operating system; and means for installing the selected user preferences on the first computer using the obtained software routine.

32. A system according to claim 31, wherein the user preferences are further selected based upon a user requesting an instance of the application on the first computer.

33. A system according to claim 31, further comprising:
means for associating users with a group; and
wherein the selected user preferences are further selected based on the group associated with a user requesting an instance of the application on the first computer.

34. A system according to claim 31, further comprising means for copying native user preferences stored on the first computer.

35. A system according to claim 34, further comprising:
means for launching an instance of the application on the first computer;
means for determining if the launched application has terminated; and
means, responsive to the means for determining, for re-installing the copied user preferences on the first computer.

36. A system according to claim 35, further comprising means for storing the user preferences on a second computer remote from the first computer.

37. A computer program product for establishing user preferences associated with an application resident on a first computer based on preferences resident on a second computer remote from the first computer, comprising:
a computer readable storage medium having computer readable program code means embodied in said medium, said computer-readable program code means comprising:
computer-readable program code means for receiving a request from a user of the first computer, wherein the received request is associated with a request for an instance of the application;
computer-readable program code means for obtaining from a computer other than the first computer, a software routine corresponding to the first computer;
computer-readable program code means for executing the software routine on the first computer;
computer-readable program code means for retrieving the user preferences associated with the application from the second computer;
computer-readable program code means for replacing native user preferences resident on the first computer and associated with the application with the retrieved user preferences; and
computer-readable program code means for launching an instance of the application on the first computer utilizing the retrieved user preferences.

38. A computer program product according to claim 37, wherein said computer-readable program code means for retrieving comprises:
computer-readable program code means for selecting user preferences associated with the application resident on the first computer from a plurality of user preferences resident on the second computer; and
computer-readable program code means for retrieving the selected user preferences.

39. A computer program product according to claim 38, wherein the user preferences are selected based upon the user requesting an instance of the application.

40. A computer program product according to claim 38, wherein the user preferences are selected based on characteristics of an operating environment of the first computer.

41. A computer program product according to claim 40, wherein the characteristics of the operating environment comprise the type of operating system of the first computer.

42. A computer program product according to claim 37, wherein said computer-readable program code means for obtaining a software routine comprises:
computer-readable program code means for selecting a software routine from a plurality of software routines stored on at least one computer other than the first computer, wherein the software routine is selected based on characteristics of the first computer; and
computer-readable program code means for retrieving the selected software routine.

43. A computer program product according to claim 42, wherein the characteristics of the first computer comprises a type of operating system of the first computer.

44. A computer program product according to claim 37, further comprising:
computer-readable program code means for storing the native user preferences;
computer-readable program code means for determining if the launched instance of the application has terminated; and
computer-readable program code means, responsive to the computer-readable program code means for determining, for replacing the retrieved user preferences with the native user preferences.

45. A computer program product according to claim 37, further comprising computer-readable program code means, responsive to said computer-readable code means for receiving, for controlling said computer-readable program code means for retrieving and computer-readable program code said means for replacing in response to each request by a user for an instance of the application.

46. A computer program product according to claim 37, further comprising:
computer-readable program code means for obtaining updated user preferences associated with an application resident on the first computer; and
computer-readable program code means for storing the updated user preferences on the second computer.

47. A computer program product according to claim 37, wherein the software routine is a machine independent software routine.

48. A computer program product according to claim 47, wherein the software routine is a JAVA applet.

49. A computer program product for establishing user preferences associated with an application resident on a first computer, comprising:
a computer readable storage medium having computer readable program code means embodied in said medium, said computer-readable program code means comprising:
computer-readable program code means for determining an operating system of the first computer;
computer-readable program code means for providing a software routine corresponding to the determined operating system to the first computer;
computer-readable program code means for selecting user preferences based on the determined operating system; and
computer-readable program code means for installing the selected user preferences on the first computer using the obtained software routine.

50. A computer program product according to claim 49, wherein the user preferences are further selected based upon a user requesting an instance of the application on the first computer.

51. A computer program product according to claim 49, further comprising:

computer-readable program code means for associating users with a group; and wherein the selected user preferences are further selected based on the group associated with a user requesting an instance of the application on the first computer.

52. A computer program product according to claim 49, further comprising computer-readable program code means for native copying user preferences stored on the first computer.

53. A computer program product according to claim 52, further comprising:

computer-readable program code means for launching an instance of the application on the first computer;

computer-readable program code means for determining if the launched application has terminated; and computer-readable program code means, responsive to the computer-readable program code means for determining, for re-installing the copied native user preferences on the first computer.

54. A computer program product according to claim 53, further comprising computer-readable program code means for storing the user preferences on a second computer remote from the first computer.

* * * * *